United States Patent
Kuroda

(10) Patent No.: US 9,056,538 B2
(45) Date of Patent: Jun. 16, 2015

(54) STABILIZER LINK AND MANUFACTURING METHOD THEREFOR

(71) Applicant: NHK SPRING CO., LTD., Yokohama-shi, Kanagawa (JP)

(72) Inventor: Shigeru Kuroda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/374,979

(22) PCT Filed: Jan. 16, 2013

(86) PCT No.: PCT/JP2013/050695
§ 371 (c)(1),
(2) Date: Jul. 28, 2014

(87) PCT Pub. No.: WO2013/121820
PCT Pub. Date: Aug. 22, 2013

(65) Prior Publication Data
US 2015/0001824 A1   Jan. 1, 2015

(30) Foreign Application Priority Data

Feb. 16, 2012   (JP) ................. 2012-031492

(51) Int. Cl.
*F16C 11/06* (2006.01)
*B60G 21/055* (2006.01)
*B60G 7/00* (2006.01)

(52) U.S. Cl.
CPC ....... *B60G 21/0551* (2013.01); *Y10T 29/49648* (2015.01); *B60G 21/055* (2013.01);

(Continued)

(58) Field of Classification Search
USPC ............... 280/124.106, 124.107, 124.152, 280/86.754, 86.756; 403/122, 132, 133, 403/135
IPC ............... B60G 21/055,2204/416; F16C 11/06, F16C 11/0685, 2226/52
See application file for complete search history.

(56) References Cited

U.S. PATENT DOCUMENTS 5,427,467 A * 6/1995 Sugiura .................. 403/140
5,947,627 A * 9/1999 Uneme et al. ............ 403/122
(Continued)

FOREIGN PATENT DOCUMENTS

JP   H5-032823 U   4/1993
JP   H06-117429 A   4/1994
(Continued)

OTHER PUBLICATIONS

Feb. 26, 2013 International Search Report issued in International Application No. PCT/JP2013/050695.

*Primary Examiner* — Faye M Fleming
(74) *Attorney, Agent, or Firm* — Oliff PLC

(57) ABSTRACT

A stabilizer link and a manufacturing method therefor in which there is less concentration of stress, the stud releasing load is improved, and the accuracy of centering of the ring member is improved. A second subassembly is formed by inserting a ball seat of a first subassembly into a ball seat receiving portion of a housing and by arranging a ring member at an opening side of the ball seat. A stopper base portion is abutted to an opening end surface of the ball seat. An outer peripheral end portion taper surface has a taper shape in which a diameter is increased toward an opening side in an axial direction, in a stopper base portion and it is abutted to a slope portion for a stopper base of the housing. An opening side of the ball seat is pressed through the ring member by caulking inwardly a caulking portion.

9 Claims, 7 Drawing Sheets

(52) U.S. Cl.
 CPC ... *B60G2204/1224* (2013.01); *B60G 2204/416* (2013.01); *F16C 11/0623* (2013.01); *B60G 7/005* (2013.01); *F16C 11/06* (2013.01); *F16C 11/0685* (2013.01); *F16C 11/0695* (2013.01)

(56) References Cited

U.S. PATENT DOCUMENTS

| | | | |
|---|---|---|---|
| 6,485,218 B1 | 11/2002 | Martinovsky | |
| 8,905,417 B2* | 12/2014 | Kuroda | 280/124.152 |
| 2013/0121754 A1* | 5/2013 | Kuroda et al. | 403/122 |
| 2013/0234412 A1* | 9/2013 | Kuroda | 280/124.107 |

FOREIGN PATENT DOCUMENTS

| | | |
|---|---|---|
| JP | 2002-510022 A | 4/2002 |
| JP | 2010-121767 A | 6/2010 |
| JP | 2010-156466 A | 7/2010 |
| WO | 2006/019145 A1 | 2/2006 |

* cited by examiner

STABILIZER LINK AND MANUFACTURING METHOD THEREFOR

TECHNICAL FIELD

The present invention relates to a stabilizer link for vehicles such as automobiles, and in particular, relates to an improved caulking for securing stud releasing load.

BACKGROUND ART

A stabilizer is a ball joint part connecting an arm or a strut of a suspension apparatus and a stabilizer apparatus. FIG. 1 is a perspective view showing a schematic structure of a front side wheel of a vehicle. Each suspension apparatus 1 is provided at left and right tires 4 and has an arm 11 and a cylinder 12. A lower end portion of the arm 11 is fixed at a bearing supporting a shaft of the tire 4. The cylinder 12 is elastically movable relatively to the arm 11. A bracket 13, to which a stabilizer link 3 is mounted, is provided at the arm 11. The suspension apparatus 1 supports the weight of a vehicle body that is applied to the tire 4. A stabilizer apparatus 2 is equipped with a bar 21 that is approximately U-shaped, and the stabilizer apparatus 2 is mounted to the vehicle body via bushes 22. The stabilizer apparatus 2 secures rolling stiffness of the vehicle.

The stabilizer links 3 are provided at the bracket 13 of the suspension apparatus 1 and at the end portion of the bar 21 of the stabilizer apparatus 2. The stabilizer links 3 are connected to each other by a support bar 70. The stabilizer link 3 transmits a load, which is generated when the suspension apparatus 1 receives an input from a road surface, to the stabilizer apparatus 2.

FIG. 2 is a side sectional diagram showing a portion of a structure of a specific example of the stabilizer link 3. The stabilizer link 3 is equipped with a ball stud 30, a ball seat 40, a housing 50, and a dust cover 60.

The ball stud 30 has a stud portion 31 and a ball portion 32 which are integrally formed. The stud portion 31 has a tapered portion 33, a straight portion 34, and a screw portion 35. The tapered portion 33 is formed at an upper end portion of the ball portion 32. A collar portion 36 and a projection portion 37 are formed at an upper end portion and a lower end portion of the straight portion 34. An upper end portion 61 of the dust cover 60 abuts between the collar portion 36 and the projection portion 37 at the straight portion 34 so as to be fixed therebetween. The screw portion 35 of the stabilizer link 3 proximate to the suspension apparatus 1 is fixed at the bracket 13 of the arm 11 by screw fastening, and the screw portion 35 of the stabilizer link 3 proximate to the stabilizer apparatus 2 is fixed at the bar 21 by screw fastening.

The ball seat 40 and the housing 50 form a pivot support member that universally supports the ball stud 30. The ball portion 32 of the ball stud 30 is press-fitted into the ball seat 40. The housing 50 holds the ball seat 40 therein. A lower end portion 62 of the dust cover 60 is held between flange portions 41 and 51 of the ball seat 40 and the housing 50.

Thermal caulking portions 42 are formed at a bottom portion of the ball seat 40 by a thermal caulking method. Specifically, the thermal caulking portion 42 is a resin portion formed by heating and transforming a pin portion of the ball sheet 40 using a heat caulking apparatus. Each thermal caulking portion 42 projects through a hole 52 of a bottom portion of the housing 50, and a leading end portion of the thermal caulking portion 42 engages with a lower surface portion of the housing 50. The ball seat 40 is fixed at the housing 50 by the thermal caulking portion 42 (for example, Patent Document 1).

However, in the heat caulking method, a heat caulking portion 42 made of resin is exposed to the outside, and therefore, there is a problem in that the thermal caulking portion 42 is broken by adhering strong acid or by contacting a foreign substance. Moreover, there is a problem in that the stud releasing load is not drastically improved, since formation position of the heat caulking portion 42, etc., is seriously constrained.

Therefore, in order to solve the above problem due to the heat caulking method, a method (a housing caulking method) in which a caulking portion at an upper end portion of the housing is caulked toward an upper end portion of the ball sheet and an upper end portion of the ball sheet is pressed and fixed by the caulking portion, is proposed, instead of the heat caulking method.

However, in the housing caulking method, since an opening side of the ball sheet is directly fixed by the caulking portion of the housing, load (caulking load) applied by the caulking portion directly acts to the opening side of the ball sheet. Therefore, the ball sheet is excessively pressed, and a positional relationship between the ball sheet and the ball stud is not appropriately ensured, and frictional force therebetween is unstable. As a result, there is a problem in that torque characteristics, etc., are unstable.

Therefore, the applicants has proposed a structure in which a ring member is interposed between a caulking portion of a housing and an opening side of a ball sheet (for example, Patent Document 2). The ring member has a stopper base portion or a stopper taper portion. The stopper taper portion is formed at an inner peripheral side of the stopper base portion and is inclined, so that diameter thereof is decreased from the opening side toward an axial direction of the stopper base portion.

In the housing caulking method using such ring member, the stopper base portion is abutted to an opening end surface of the ball sheet, the stopper taper portion is abutted to a slope portion for a stopper taper of the ball sheet, and the caulking portion of the housing is caulked inwardly. Thus, the opening side of the ball sheet can be pressed through the ring member by the caulking portion of the housing.

Patent Document 1 is Japanese Unexamined Patent Application Publication No. Hei 6-117429, and Patent Document 2 is Japanese Unexamined Patent Application Publication No. 2010-156466.

SUMMARY OF THE INVENTION

Problems Solved by the Invention

In the housing caulking method using the ring member, in order to effectively decrease an input of the caulking portion load to the ball sheet, a step portion having a cross sectional U-shape is provided between the ball sheet receiving portion and the caulking portion in the side surface portion of the housing, and the step portion is fitted into an inner peripheral end surface of the stopper base portion of the ring member. In this case, the caulking load is supported through the stopper base portion of the ring member by the step portion of the housing.

With respect to such a fixed shape of the inner peripheral end surface of the stopper base portion by the step portion of the housing, further suitable shapes are desired from the viewpoint of improvement of characteristic of the stabilizer link (for example, reduction of stress concentration, improvement of the stud releasing load, and improvement of accuracy in centering (positioning) of the ring member).

Specifically, in the housing caulking method shown in Patent Document 2, since the fixed shape is a cross sectional U-shape, two bending lines are formed by caulking, and there is a problem in that the stress concentration is caused by the bending lines. In addition, when the load is applied to a stud releasing direction, the rotating force in which an inner peripheral end portion of the stopper base portion is lifted to an opening side in an axial direction, acts. However, in this case, it is difficult to generate resistance force against the rotating force since a surface for receiving the rotating force is an axial direction surface of the step portion. Therefore, it is difficult to further improve the stud releasing load. Furthermore, the centering (positioning) of the ring member is dependent on the stopper taper portion of the ball sheet; however, since the ball sheet is made of resin, the accuracy improvement of the positioning is limited from the viewpoint of the machining accuracy.

Means for Solving the Problems

Therefore, an object of the present invention is to provide a stabilizer link and a manufacturing method therefor, in which there is less concentration of stress, the stud releasing load is improved, the accuracy of centering of the ring member is improved.

The manufacturing method for stabilizer links of the present invention includes a preparing step in which a stud ball having a ball portion, and a ball seat having an opening end surface, an overhanging portion, and a ball receiving portion from an opening side of a side surface portion in this order, are prepared, a slope portion for a stopper base forming step in which a housing having a caulking portion and a ball seat receiving portion from an opening side of a side surface portion, in this order, is molded, and a slope portion for a stopper base having a taper shape in which a diameter is increased toward an opening side in an axial direction, is formed between the caulking portion and the ball seat receiving portion, an outer peripheral portion taper surface forming step in which a ring member having a stopper base portion is molded, and in molding of the ring member, an outer peripheral portion taper surface is formed at an opposite side to the opening side in an outer peripheral end portion of the stopper base portion, a first subassembly forming step in which a first subassembly having the ball stud and the ball seat is formed by inserting the ball stud and the ball portion into the ball receiving portion of the ball seat, an abutting step in which a second subassembly is formed by inserting the ball seat of the first subassembly into the ball receiving portion of the housing, and by arranging the ring member at an opening side of the ball seat, and in the arranging of the ring member, the stopper base portion is abutted to the opening end surface of the ball seat, and a pressing step in which the caulking portion of the housing of the second subassembly is caulked inwardly by using a pressing member, and the opening side of the ball seat is pressed through the ring member by the caulking portion, wherein in the forming of the second subassembly, the outer peripheral end portion taper surface of the stopper base portion of the ring member is abutted to the slope portion for a stopper base of the housing.

In the manufacturing method for stabilizer links according to the present invention, the opening side of the ball sheet can be pressed through the ring member by caulking inwardly the caulking portion of the housing. Therefore, since the opening side of the ball sheet is not directly fixed by the caulking portion of the housing, torque characteristics, etc., can be stable, and moreover, the ball sheet can be prevented from separating from the housing, and the stud releasing load can be ensured.

Here, in the manufacturing method for stabilizer links according to the present invention, in the formation of the second subassembly, the outer peripheral end portion taper surface of the stopper base portion of the ring member and the slope portion for a stopper base of the side surface portion of the housing are abutted. The slope portion for a stopper base has a taper shape in which the diameter is increased toward the opening side in an axial direction. A thickness of a boundary portion between the caulking portion and the slope portion for a stopper base, can be reduced in thickness, and therefore, the boundary portion acts as a starting point of the bending when the caulking portion is caulked. In this case, since a bending line is formed only at the boundary portion, the bending line that causes stress concentration can be decreased and a bending position can be reliably positioned.

In addition, in centering (positioning) of the ring member, a slope portion for a stopper base of the housing can be used. In this case, the machining accuracy of the slope portion for a stopper base can be improved by making the housing of metal, and as a result, the accuracy of the centering of the ring member can be improved. Furthermore, for example, in the case in which a rotating in which an inner peripheral side end of the stopper base portion is lifted to an opening side in an axial direction acts when the load is applied to a stud releasing direction, the slope portion for a stopper base is different from an axial direction surface of a conventional step portion having a U-shaped cross section and is not parallel to an axial direction, and moreover, resistance force for the rotating force can be effectively increased since area thereof is increased. Therefore, the stud releasing load can be further improved.

The manufacturing method for stabilizer links according to the present invention can have various structures in order to improve various characteristics. For example, in the forming of the ring member, a stopper taper portion may be formed at an inner peripheral side of the stopper base portion, and an inner peripheral end portion taper surface may be formed on an edge at an opening side in the stopper taper portion. In arranging of the ring member, the stopper taper portion may be abutted to a slope portion of the ball sheet.

An inclined angle for a radial direction of the outer peripheral end portion taper surface may be set to be not greater than 60 degrees. A length in a radial direction of a contact area with the opening end surface of the ball sheet in the stopper base portion of the ring member may be set to be not less than a thickness of the stopper base portion. The ring member is formed by a C-shaped member or half-split members having a space portion between opening end surfaces, and a circumferential direction length of the space portion may be set to be not greater than 25% of total circumferential direction length.

The inclined angle for an axial direction of the stopper taper portion of the ring member may be set to be in a range of not less than 30 degrees and not more than 60 degrees. In the case in which an inner diameter of the stopper taper portion at an endpoint of a contact surface with the slope portion for a stopper taper of the ball sheet is set to be d1, and a ball diameter of the ball stud of the ball portion is set to be d2, the inner diameter d1 of the ring member and the ball diameter d2 of the ball stud satisfy the following Equation 1.

$$d2 \times 0.88 \leq d1 \leq d2 \times 0.98 \qquad \text{Equation 1}$$

A stabilizer link of the present invention is produced by the manufacturing method for stabilizer links according to the aspect of the present invention, and it has a ball stud, a ball seat, a housing, and a ring member. The stabilizer link of the present invention can obtain the same effect as those of the manufacturing method for stabilizer links according to the aspect of the present invention.

The stabilizer link of the present invention can use various structures. For example, in the case in which a length in a radial direction of the outer peripheral end portion taper surface of the stopper base portion of the ring member is set to be L2, a space between an end surface of the caulking portion of the caulked housing and an opening side of the outer peripheral end portion of the stopper base portion is set to be L3, a space between an end surface of the caulking portion of the housing and an outermost portion of the ball portion of the ball stud is set to be L4, an inclined angle for a radial direction of the outer peripheral end portion taper surface be set to be θ2, a ball diameter of the ball stud is set to be d2, a stud releasing load on the ball stud is set to be P, and a lower strength of material tensile strengths of the housing and the ring member is set to be σB, the length in a radial direction L2 of the stopper base portion satisfies the following Equation 2.

$$\frac{\left(\frac{P}{\pi \times d2}\right) \times \left(\frac{L4}{L3}\right)}{\frac{\sigma B}{\cos \theta 2}} \leq L2 \qquad \text{Equation 2}$$

According to the stabilizer link or the manufacturing method therefor of the present invention, there is less concentration of stress, the stud releasing load can be improved, the accuracy of centering of the ring member can be improved, and other effects can be obtained.

EXPLANATION OF REFERENCE NUMERALS

Figure 1:
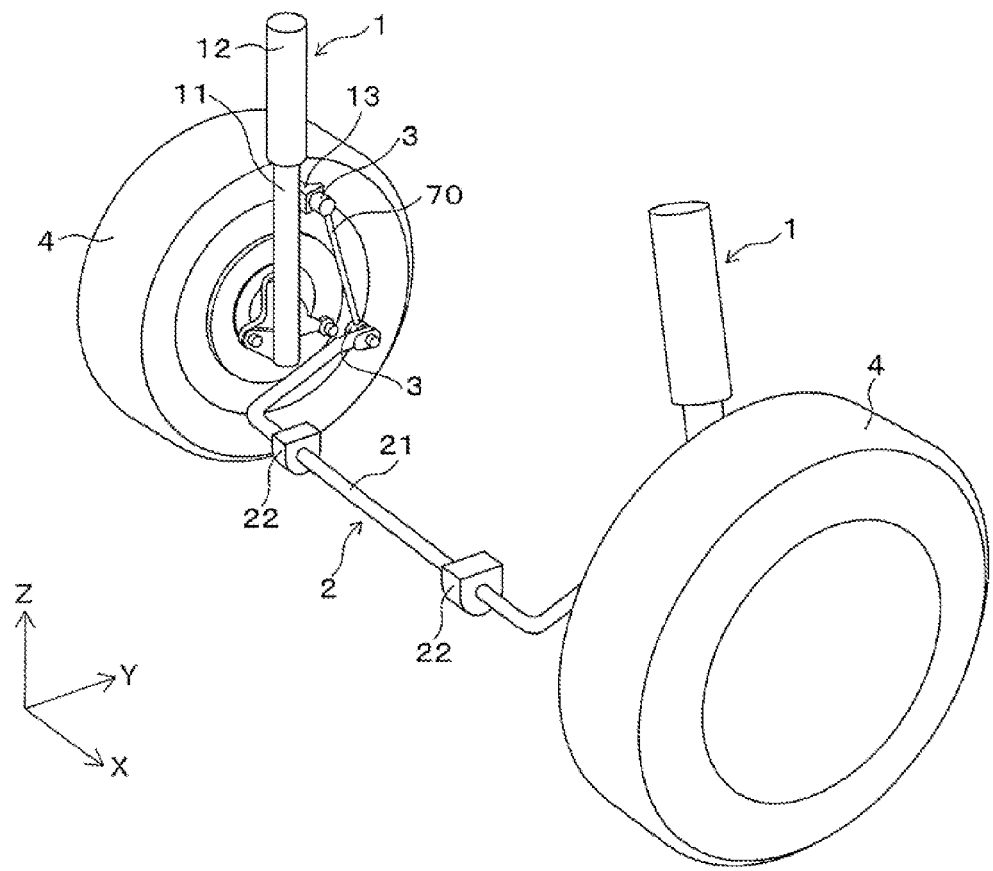
FIG. 1 is a perspective view showing a schematic structure of a front side wheel of vehicle.

Reference numeral 100 denotes a stabilizer link, 101 denotes a first subassembly, 102 denotes a second subassembly, 110 denotes a ball stud, 111 denotes a stud portion, 112 denotes a ball portion, 120 denotes a ball seat, 120A denotes an opening portion, 121 denotes a side surface portion, 122 denotes a bottom portion, 124 denotes an overhanging portion, 125 denotes an opening end surface, 126 denotes a slope portion for a stopper taper (a slope portion), 123 denotes a bole receiving portion, 130 denotes a housing, 130A denotes an opening portion, 131 denotes a side surface portion, 132 denotes a bottom portion, 133 denotes a ball seat receiving portion, 134 denotes a slope portion for a stopper base, 135 denotes a caulking portion, 140 denotes a ring member, 140A denotes a spacing portion, 141 denotes a stopper base portion, 142 denotes a stopper taper portion, 143 denotes an outer peripheral end portion taper surface, and 144 denotes an inner peripheral end portion taper surface.

DESCRIPTION OF THE PREFERRED EMBODIMENTS

Figure 2:
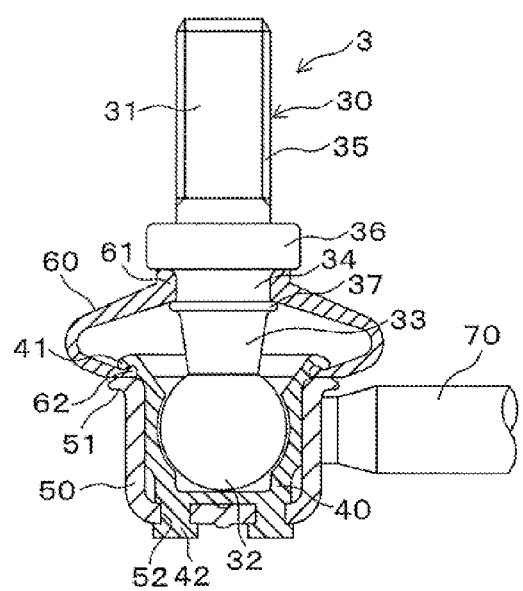
FIG. 2 is a side cross sectional view showing a schematic structure of a conventional stabilizer link.
Figure 8:
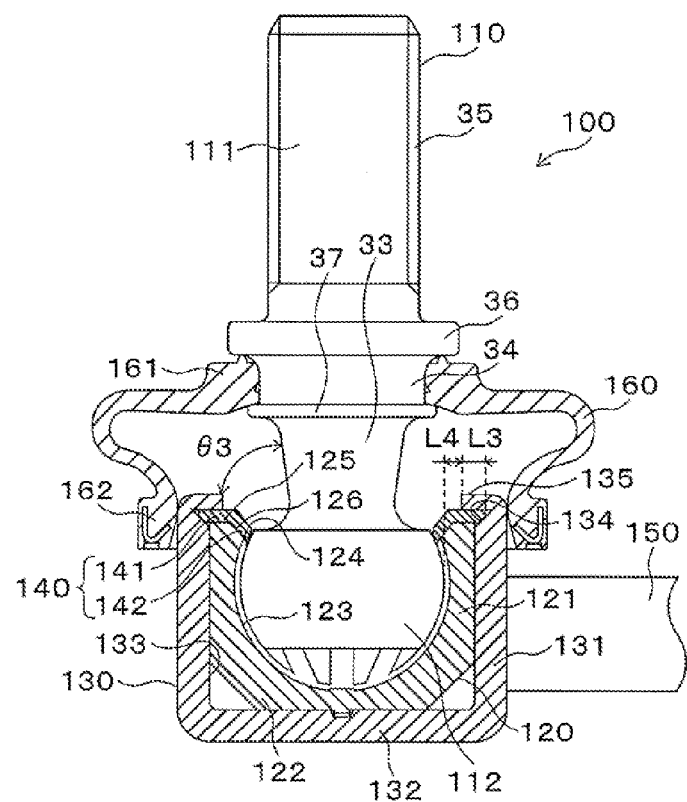
FIG. 8 is a side cross sectional view showing a schematic structure of a stabilizer link produced by a manufacturing method for stabilizer links according to an embodiment of the present invention.

In the following, an embodiment of the present invention will be explained with reference to the Figures. FIGS. 3 to 5 are side cross sectional views showing each process of a manufacturing method for stabilizer link according to an embodiment of the present invention. FIG. 8 is a side cross sectional view showing a schematic structure of a stabilizer link produced by a manufacturing method for stabilizer link according to an embodiment of the present invention. With respect to the stabilizer link 100 in present embodiments, the similar members to those of the stabilizer link 3 shown in FIG. 2 are represented by the same reference numerals, and the explanations thereof are omitted.

Figure 3A:
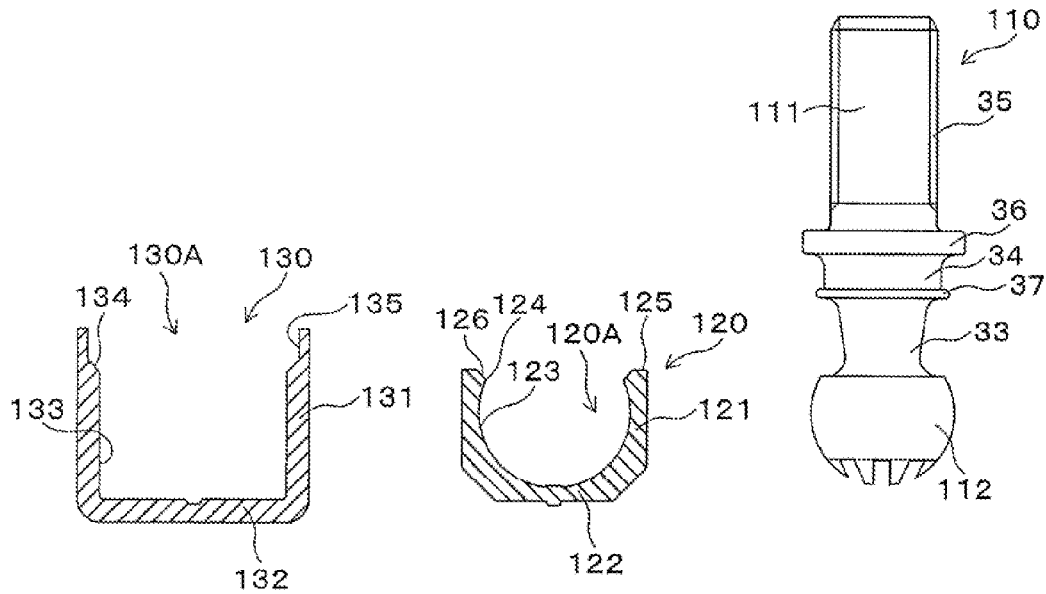
FIGS. 3A and 3B are side cross sectional views of a schematic structure showing each process of a manufacturing method for stabilizer links according to an embodiment of the present invention.

First, a ball stud 110, a ball sheet 120 and a housing 130 as shown in FIG. 3A, for example are prepared, and a ring member 140 shown in FIG. 6 is prepared.

The ball stud 110 has a stud portion 111 and a ball portion 112 made of metal and integrally molded, for example. The stud portion 111 has a taper portion 33, a straight portion 34, a screw portion 35, a flange portion 36 and a convex portion 37.

The ball sheet 120 is made of resin such as POM (polyacetal), for example, and has a side surface portion 121, a bottom portion 122 and a ball receiving portion 123, for example, and an opening portion 120A is formed on an upper surface of the ball sheet 120. The ball receiving portion 123 is a spherical concavity formed by an inner peripheral surface of the side surface portion 121 and an upper surface of the bottom portion 122. An overhanging portion 124 that protrudes inwardly in a radial direction is formed at an upper end portion of the ball receiving portion 123. The overhanging portion 124 prevents the ball portion 112 from separating from the ball receiving portion 123. An opening end surface 125 that, for example, is a flat plane, is formed on an upper surface of the side surface portion 121. A slope portion for a stopper taper 126 (a slope portion) is formed between the overhanging portion 124 and the opening end surface 125. The slope portion for a stopper taper 126 is inclined, so that a diameter thereof is reduced downwardly in an axial direction.

The housing 130 is produced by press-molding a metallic plate, etc., for example. The housing 130 has a side surface portion 131, a bottom portion 132 and a ball sheet receiving portion 133, for example, and an opening 130A is formed on an upper surface of the housing 130. The side surface portion 131 of the housing 130 has a side surface body, and a slope portion for a stopper base 134 and a caulking portion 135 are formed at an upper end portion of the side surface body. The slope portion for a stopper base 134 is inclined so that a diameter thereof is increased upwardly from an upper end portion of the side surface body. The caulking portion 135 extends upwardly from an upper end portion of the slope portion for a stopper base 134 in a state in which a cross section is straight. The caulking portion 135 has the same inner and outer diameters as those of the upper end portion of the slope portion for a stopper base 134, for example, and has a thickness that is thinner than that of the side surface body. A support bar 150 (shown only in FIG. 8) made of metal, for example, is integrally molded on the housing 130.

Figure 6A:
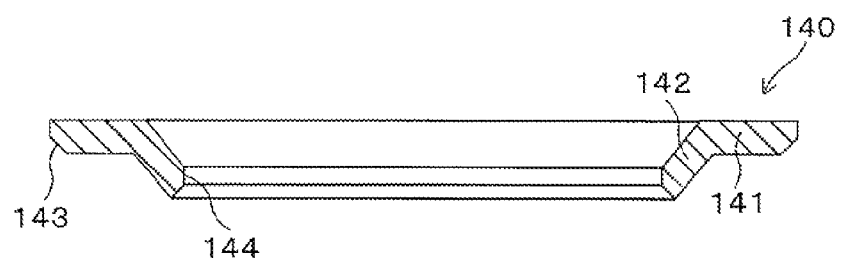
FIG. 6A is a side cross sectional view showing an overall structure of a ring member used in a manufacturing method for stabilizer links according to an embodiment of the present invention.

A ring member 140 is produced by press-molding a metallic plate, etc., for example. Alternatively, the ring member 140 is produced by resin-molding. In this case, it is preferable to use resin having a higher strength and hardness than that of the ball sheet 120. The ring member 140 has a stopper base portion 141, which is a flat portion with an opening at the center, as shown in FIG. 6A, for example. It is preferable to form a stopper taper portion 142 on an inner peripheral surface of the stopper base portion 141. The stopper taper portion 142 is inclined so that a diameter thereof is reduced downwardly in an axial direction from the stopper base portion 141, for example.

A taper surface of an outer peripheral end portion 143 (a chamfer portion) is formed on a lower side of an outer periphery of the stopper base portion 141 (an opposite side for the opening). The outer peripheral end portion 143 is inclined, so that a diameter thereof is increased upwardly in an axial direction, for example, and is connected with an outer peripheral end surface having a straight cross section of the stopper base portion 141. It is preferable that a taper surface of an inner peripheral end portion 144 (a chamfer portion) be formed on an upper side of an inner periphery of the stopper taper portion 142 (a side of the opening). The inner peripheral end portion 144 is formed so as to incline against an upper surface of the stopper taper portion 142, for example, and is connected with an inner peripheral end surface having a straight cross section of the stopper taper portion 142. In this case, the inner peripheral end portion 144 extends along an axial direction, for example.

Figure 7A:
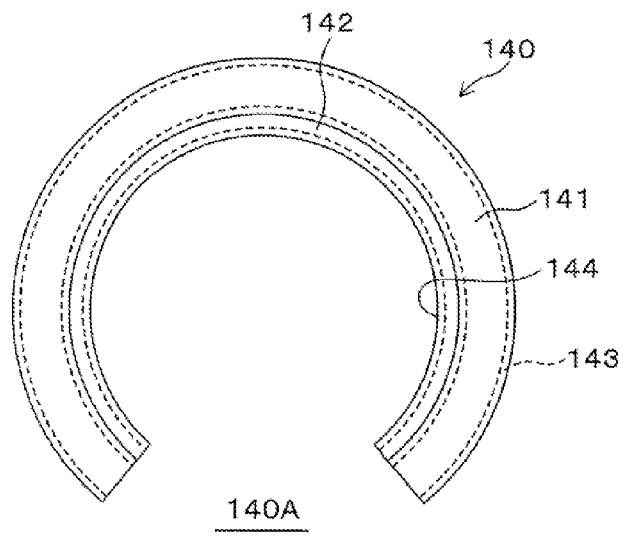
FIGS. 7A and 7B are top views showing a schematic structure of a ring member used in a manufacturing method for stabilizer links according to an embodiment of the present invention.
Figure 7B:
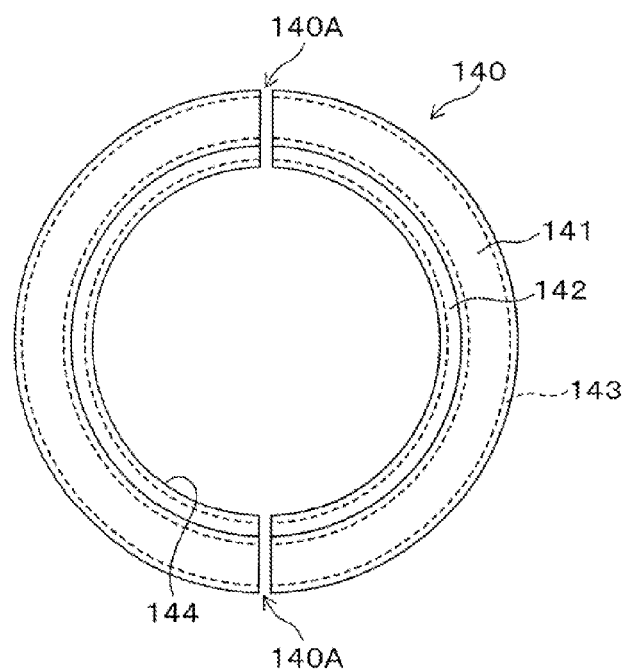

The ring member 140 has an opening end surface for example, and it is preferable to form a space portion between the opening end surfaces. As such a ring member 140, for example, a C-shaped member shown in FIG. 7A or a pair of half-split members shown in FIG. 7B can be used. In the case in which the C-shaped member is used, mounting is easier than the case in which the half-split members are used. It is preferable that a circumferential direction length of a space portion 140A between opening end surfaces of the C-shaped member, and a circumferential direction length of two space portions 140A and 140A between end surfaces of the half-split members, be set to be 25% or less of total circumferential direction length including a main body portion (a solid portion) and the space portion 140A.

Figure 3B:
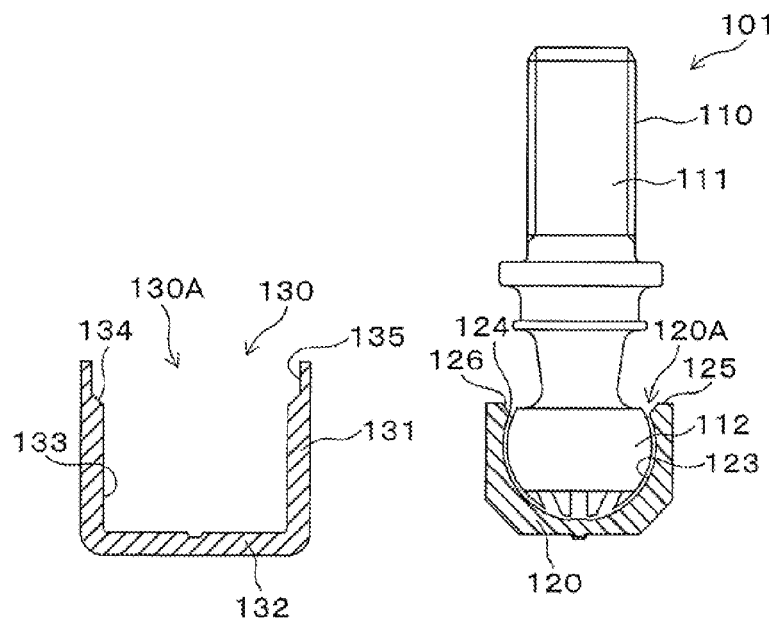

Next, the ball portion 112 of the ball stud 110 is press-fitted into a ball sheet receiving portion 133 of the ball sheet 120 by inserting from the opening portion 120A of the ball sheet 120. Thus, the first subassembly 101 consisting of the ball stud 110 and the ball sheet 120 is formed as shown in FIG. 3B, for example.

Next, the first subassembly 101 of the ball sheet 120 is press-fitted into a ball sheet receiving portion 133 of the housing 130 by inserting from the opening portion 130A of the housing 130, and the ring member 140 is arranged at an opening side of the ball sheet 120 by inserting from the opening portion 130A of the housing 130. Thus, the second subassembly 102 consisting of the first assembly 101, the housing 130 and the ring member 140 is formed as shown in FIG. 4A, for example.

In the insertion of the ring member 140, for example, a taper portion 33 of the ball stud 110 can be arranged at the opening portion through the space portion 140A of the ring member 140, and therefore, it is not necessary to pass the flange portion 36 of the ball stud 110 into the ring member 140. In the arrangement of the ring member 140, the stopper base portion 141 of the ring member 140 is abutted to the opening end surface 125 of the ball sheet 120, and the stopper taper portion 142 is abutted to the slope portion for a stopper taper 126 of the ball sheet 120. In this case, the outer peripheral end portion taper surface 143 of the stopper base portion 141 is abutted to the slope portion for a stopper base 134 of the side surface portion 131 of the housing 130.

Figure 4A:
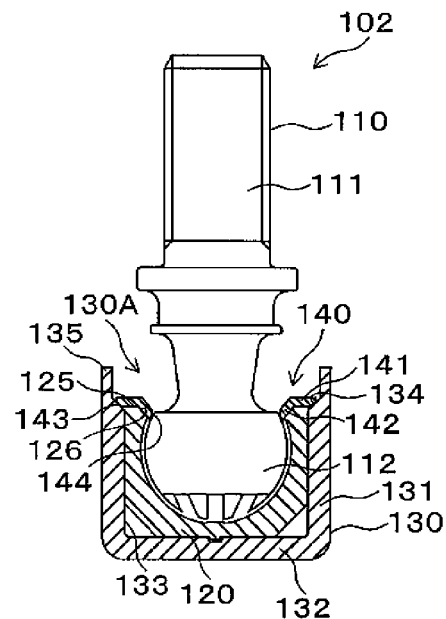
FIGS. 4A and 4B are side cross sectional views of a schematic structure showing each process after the processes shown in FIGS. 3A and 3B.
Figure 6B:
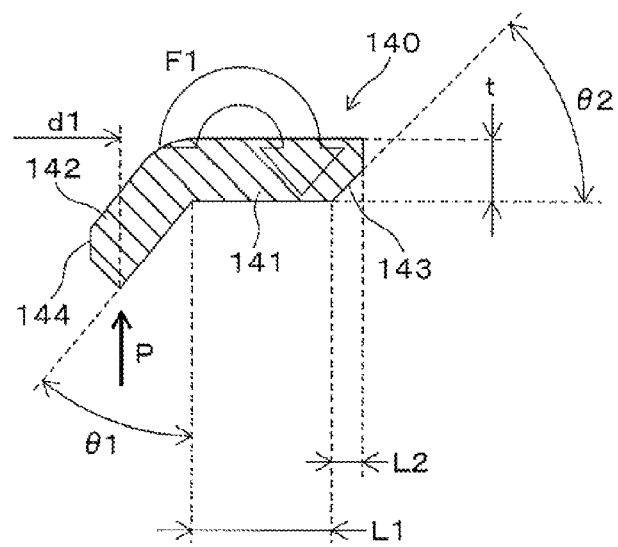
FIG. 6B is a side cross sectional view showing a right-half structure thereof for explaining a preferable size of each portion.

With respect to the size of each part of the ring member 140, an inner diameter of the stopper taper portion 142 at an endpoint of a contact surface with the slope portion for a stopper taper 126 of the ball sheet 120 shown in FIGS. 4A and 6B, for example, is set to be d1, and a ball diameter of the ball stud 110 of the ball portion 112 is set to be d2. In this case, it is preferable that the inner diameter d1 of the ring member 140 and the ball diameter d2 of the ball stud 110 satisfy the following Equation 1.

$$d2 \times 0.88 \leq d1 \leq d2 \times 0.98 \qquad \text{Equation 1}$$

In the insertion of the ball stud 110 of the ball portion 112, the ball portion 112 is forcedly press-fitted into the ball receiving portion 123, so as to increase a diameter of the overhanging portion 124 of the ball sheet 120, for example. In this case, when an opening diameter of the opening portion 120A of the ball sheet 120 is set to be small, there is a problem in that a crack may be generated at the opening portion 120A of the ball sheet 120, even if the ball sheet 120 is extended in inserting the ball portion 112. Considering the allowable elongation percentage of POM (polyacetal) generally used as a material of the ball sheet 120, it is necessary that the opening diameter of the opening portion 120A of the ball sheet 120 be set to be 0.88 times or more (d2×0.88 or more) of the ball diameter d2. It is necessary that the inner diameter d1 of the stopper taper portion 142 of the ring member 140 be set to be 0.88 times or more (d2×0.88 or more) of the ball diameter d2, corresponding to the above setting. In contrast, considering production accuracy of the ring member 140, etc., it is necessary that the inner diameter d1 of the ring member 140 be set to be 0.98 times or less (d2×0.98 or less) of the ball diameter d2, in order to reliably reach the stopper taper portion 142 of the ring member 140 to the ball diameter of the ball stud 110 of the ball portion 112.

It is preferable that an inclined angle θ1 for an axial direction of the stopper taper portion 142 shown in FIG. 6B, for example, be set to be in a range of not less than 30 degrees and not more than 60 degrees. It is suitable that a length in a radial direction L1 of a contact area with the opening end surface 125 of the ball sheet 120 in the stopper base portion 141 be set to be not less than a thickness t of the stopper base portion 141. It is preferable that an inclined angle θ2 for a radial direction of the outer peripheral end portion taper surface 143 be set to be 60 degrees or less.

Next, the caulking portion 135 of the housing 130 is caulked by using a die set including an upper die and a lower die, for example. Specifically, a lower die 81 having a concavity 81A, as shown in FIGS. 4B to 5B, can be used as a lower die. The housing 130 of the second subassembly 102 is fixed by fitting to the concavity 81A of the lower die 81. As an upper die, for example, pressing members 82 to 84 shown in FIGS. 4B to 5B can be used.

Figure 4B:
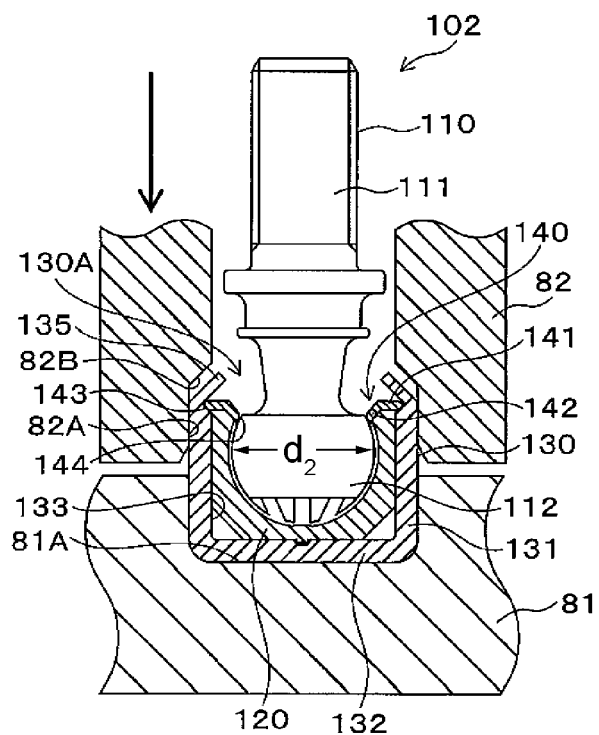

The pressing member 82 shown in FIG. 4B has a supporting portion 82A and a pressing portion 82B. For example, the supporting portion 82A slides to the side surface portion 131 of the housing 130 of the second subassembly 102 when the pressing member 82 is moved to a direction that goes to the lower die 81 (arrow direction in the figure). The pressing portion 82B is a taper portion for inwardly bending the caulking portion 135 of the housing 130, and the inclined angle for a radial direction of the pressing portion 82B is 45 degrees, for example.

Figure 5A:
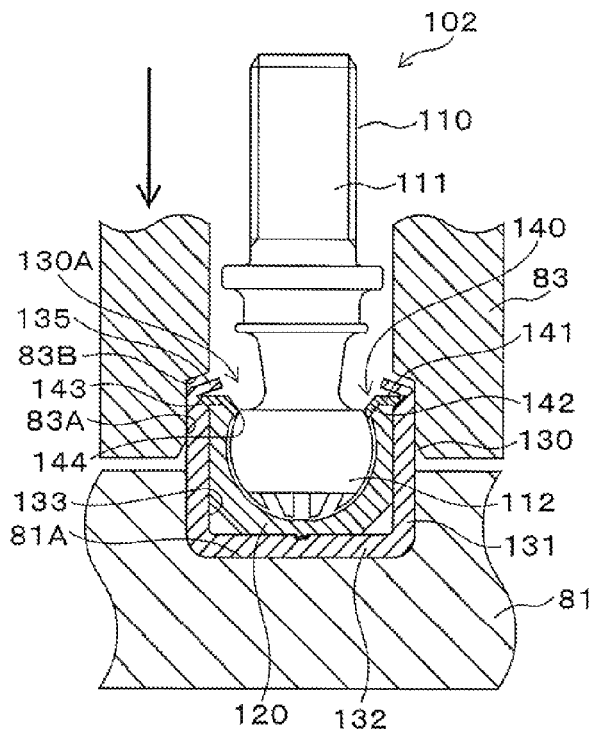
FIGS. 5A and 5B are side cross sectional views of a schematic structure showing each process after the processes shown in FIGS. 4A and 4B.

The pressing member 83 shown in FIG. 5A has a supporting portion 83A and a pressing portion 83B. The supporting portion 83A has the same function as that of the supporting portion 82A. The pressing portion 83B is similar to the pressing portion 82B, except that the inclined angle for a radial direction is 20 degrees, for example.

Figure 5B:
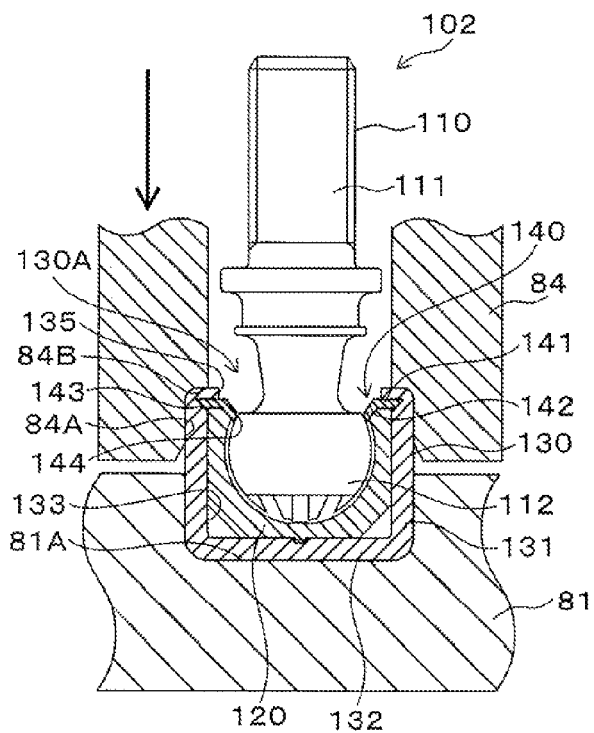

The pressing member 84 shown in FIG. 5B has a supporting portion 84A and a pressuring portion 84B. The supporting portion 84A has the same function as that of the supporting portion 82A. The pressing portion 84B is similar to the pressing portion 82B, except that the inclined angle for a radial direction is 0 degrees, for example. Here, the pressuring portions 82B to 84B are inclined for a radial direction, and the inclined angle is not limited to the above values and may be set so as to gradually decrease in this order.

The caulking portion 135 of the housing 130 is caulked by gradually bending inwardly using such pressing portions 82B to 84B. Thus, the stopper base portion 141 of the ring member 140 can be fixed to an opening side of the ball sheet 120 by the caulking portion 135. As the result, the opening end surface 125 of the ball sheet 120 can be pressed by the stopper base portion 141, and the slope portion for a stopper taper 126 of the ball sheet 120 can be pressed by the stopper taper portion 142.

Next, a dust cover 160 is fixed to the second subassembly 102, as shown in FIG. 8, for example. In this case, an upper end portion 161 of the dust cover 160 is fixed by abutting between the flange portion 36 and the convex portion 37 in the straight portion 34 of the ball stud 110. A lower end portion 162 of the dust cover 160 is fixed by abutting to an outer peripheral surface of the side surface portion 131 of the housing 130. Therefore, a stabilizer link 100 can be produced.

In the case in which a length in a radial direction of the outer peripheral end portion taper surface 143 of the stopper base portion 141 of the ring member 140 shown in FIG. 6B, for example, is set to be L2, a space between an end surface of the caulking portion 135 of the caulked housing 130 and an opening side of the outer peripheral end portion of the stopper base portion 141, shown in FIG. 8, for example, is set to be L3, a space between an end surface of the caulking portion 135 of the housing 130 and an outermost portion of the ball portion 112 of the ball stud 110, is set to be L4, a stud releasing load on the ball stud 110 is set to be P, and a lower strength of material tensile strengths of the housing 130 and the ring member 140 is set to be σB, it is preferable that the length in a radial direction L2 of the outer peripheral end portion taper surface 143 of the stopper base portion 141 satisfy the following Equation 2.

$$\frac{\left(\frac{P}{\pi \times d2}\right) \times \left(\frac{L4}{L3}\right)}{\frac{\sigma B}{\cos\theta 2}} \leq L2 \quad \text{Equation 2}$$

Figure 9:
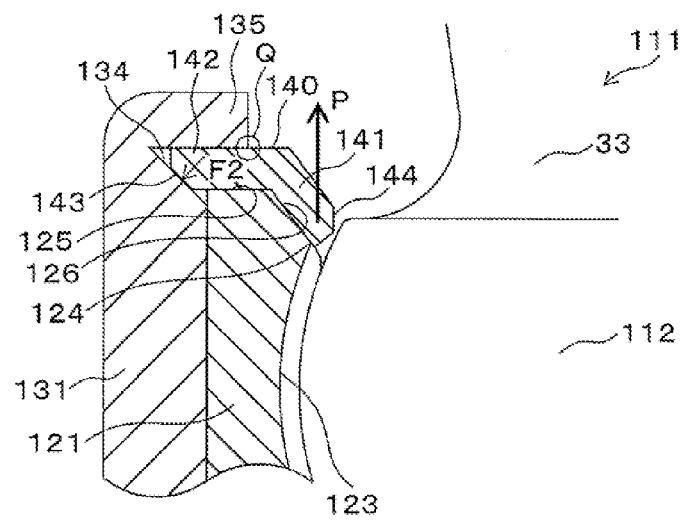
FIG. 9 is an enlarged side cross sectional view showing a schematic structure of a portion including a ring member of the stabilizer link shown in FIG. 8.

In a case in which the load P is applied in a stud releasing direction (an arrow direction in figure), as shown in FIG. 9 for example, a contact portion between an upper surface of the stopper base portion 141 of the ring member 140 and a right end surface of the caulking portion 135 of the housing 130 acts as a supporting point (an intersection point shown in a frame represented by the reference character Q). Then, a pressing force F2 is generated from the outer peripheral end portion taper surface 143 to the slope portion for a stopper base 134 by the principal of leverage. In this case, when a surface pressure generated on the outer peripheral end portion taper surface 143 by the pressing force F2 exceeds the strength σB, there is a problem in that the housing 130 or the ring member 140 is broken or deformed. In order to effectively provide from generating such problem, it is preferable to satisfy an Equation 3, and the Equation 2 can be obtained by the Equation 3.

$$\frac{\left(\frac{P}{\pi \times d2}\right) \times \left(\frac{L4}{L3}\right)}{\frac{L2}{\cos\theta 2}} \leq \sigma B \quad \text{Equation 3}$$

With respect to the Equation 2, in the case in which for example, the stud releasing load P is set to be 4000 N, the ball diameter d2 is set to be 1 mm, the space ratio (L4/L3) is set to be 0.5, the inclined angle θ2 is set to be 45 degrees, and the lower strength σB is set to be 300 N/mm², the length in a radial direction L2 is 0.19 mm or more.

As described above, in the present embodiment, the opening side of the ball sheet 120 can be pressed through the ring member 140 by caulking inwardly the caulking portion 135. Therefore, since the opening side of the ball sheet 120 is not directly fixed by the caulking portion 135 of the housing 130, the ball sheet 120 can be prevented from separating from the housing 130, and the stud releasing load can be ensured.

Here, in the present embodiment, in the formation of the second subassembly 102, the outer peripheral end portion taper surface 143 of the stopper base portion 141 of the ring member 140 and the slope portion for a stopper base 134 of the side surface portion 131 of the housing 130 are abutted. The slope portion for a stopper base 134 has a taper shape in which the diameter is increased toward the opening side in an axial direction. A thickness of a boundary portion between the caulking portion 135 and the slope portion for a stopper base 134 can be reduced in thickness, and therefore, the boundary portion acts as a starting point of the bending when the caulking portion 135 is caulked. In this case, since a bending line is formed only at the boundary portion, the bending line, which causes stress concentration, can be decreased, and a bending position can be reliably positioned.

In addition, the slope portion for a stopper base 134 of the housing 130 can be used for centering (positioning) of the ring member 140. In this case, by making the housing 130 of metal, machining accuracy of the slope portion for a stopper base 134 can be improved, and accuracy of the centering of the ring member 140 can be improved. Furthermore, in the case in which a rotating force F1 (FIG. 6B) for lifting an inner peripheral end portion of the stopper base portion 141 to an opening side in an axial direction acts when the load is applied in a stud releasing direction for example, the slope portion for a stopper base 134 is different from an axial direction surface of a conventional step portion having a U-shaped cross section and is not parallel to an axial direction, and moreover, resistance force for the rotating force can be effectively increased since area thereof is increased. Therefore, the stud releasing load can be further improved.

In particular, the stopper taper portion 142 can be overhung against the outermost portion of the ball portion 112 of the ball stud 110, since the stopper taper portion 142 is abutted to the slope portion for a stopper taper 126 of the ball sheet 120. Moreover, on the stopper taper portion 142, deformation resistance force is generated in a pressing direction to the slope portion for a stopper taper 126 of the ball sheet 120, and rigidity can be improved. Thus, destruction of the overhang portion 124 of the ball sheet 120 due to the ball portion 112 of the ball stud 110 can be effectively prevented. Therefore, the ball stud 110 can be effectively prevented from separating from the ball sheet 120, and the stud releasing load can be further improved.

In this case, the ring member 140 is arranged between the caulking portion 135 of housing 130 and the opening side of the ball sheet 120, and it is not necessary to overhang the caulking portion 135 of the housing 130, and therefore, the space angle θ3 (FIG. 8) between the caulking portion 135 of the housing 130 and the stud portion 111 of the ball stud 110 can be sufficiently ensured. As a result, a swinging angle of the ball stud 110 can be sufficiently ensured. Moreover, interference between the inner peripheral end portion of the stopper taper portion 142 of the ring member 140 and the ball stud 110 can be effectively decreased by forming the inner peripheral end portion taper surface 144 on the stopper taper portion 142 of the ring member 140, and therefore, the swinging angle of the ball stud 110 can be sufficiently ensured.

The resistance force can be drastically improved by setting the inclined angle θ2 (FIG. 6B) for a radial direction of the outer peripheral end portion taper surface 143 to be 60 degrees or less, and therefore, the stud releasing load can be further improved. In addition, by setting the length L1 in a radial direction (FIG. 6B) of the contact portion with the opening end surface 125 of the ball sheet 120 in the stopper base portion 141 to be not less than the thickness t (FIG. 6B) of the stopper base portion 141, the resistance force for the rotating force F1 can be effectively generated in the stopper base portion 141 when the load is applied in a stud releasing direction, and therefore, the rotation (twist) in a cross section in an axial direction can be effectively prevented. As a result, the stud releasing load can be further improved. Furthermore, the length in a radial direction L2 of the outer peripheral end portion taper surface 143 of the stopper base portion 141 satisfies the Equation 2, and therefore, the housing 130 and the ring member 140 can be effectively prevented from breaking or deforming due to the pressing force F2 (FIG. 9) generated by load in a stud releasing direction.

In addition, since a C-shaped member or a pair of half-split members in which a space portion 140A is formed between the opening end surfaces, is used as a ring member 140, the ball portion 112 of the ball stud 110 can be forcedly press-fitted into the ball receiving portion 123 of the ball sheet 120. Additionally, in the insertion of the ring member 140, it is not necessary to pass the flange portion 36 of the stud portion 111 of the ball stud 110. As a result, the outer diameter of the flange portion 36 of the stud portion 111 of the ball stud 110 can be increased.

In this case, by setting a circumferential direction length of the space portion 140A of the ring member 140 to be 25% or less of total circumferential direction length including the main body portion (a solid portion) and the space portion 140A, the ball sheet 120 can be stably pressed through the ring member 140 by the caulking portion 135, and therefore, the stud releasing load can be further improved.

In addition, the inner diameter d1 (FIG. 6B) of the ring member 140 and the ball diameter d2 of the ball stud 110 satisfy the Equation 1, and therefore, the stud releasing load can be further improved, and it is suitable to satisfy the Equation 1 when an opening diameter of the ball sheet 120 and the production accuracy of the ring member 140 are considered. Furthermore, the inclined angle θ1 (FIG. 6B) for an axial direction of the stopper taper portion 142 of the ring member 140 is set to be in a range of not less than 30 degrees and not more than 60 degrees, and therefore, rigidity can be effectively improved by the deformation resistance force on the stopper taper portion 142.

The invention claimed is:

1. A manufacturing method for stabilizer links, comprising:
    a preparing step in which a stud ball having a ball portion, and a ball seat having an opening end surface, an overhanging portion, and a ball receiving portion from an opening side of a side surface portion in this order, are prepared;
    a slope portion for a stopper base forming step in which a housing having a caulking portion and a ball seat receiving portion from an opening side of a side surface portion in this order, is molded, and a slope portion for a stopper base having a taper shape in which a diameter is increased toward an opening side in an axial direction, is formed between the caulking portion and the ball seat receiving portion;
    an outer peripheral end portion taper surface forming step in which a ring member having a stopper base portion is molded, and in molding of the ring member, an outer peripheral end portion taper surface is formed at an opposite side to the opening side in an outer peripheral end portion of the stopper base portion;
    a first subassembly forming step in which a first subassembly having the ball stud and the ball seat is formed by inserting the ball stud and the ball portion into the ball receiving portion of the ball seat;
    an abutting step in which a second subassembly is formed by inserting the ball seat of the first subassembly into the ball receiving portion of the housing, and by arranging the ring member at an opening side of the ball seat, and in the arranging of the ring member, the stopper base portion is abutted to the opening end surface of the ball seat; and
    a pressing step in which the caulking portion of the housing of the second subassembly is caulked inwardly by using a pressing member, and the opening side of the ball seat is pressed through the ring member by the caulking portion,
    wherein in the forming of the second subassembly, the outer peripheral end portion taper surface of the stopper base portion of the ring member is abutted to the slope portion for a stopper base of the housing.

2. The manufacturing method for stabilizer links according to claim 1, wherein in forming of the ring member, a stopper taper portion is formed at an inner peripheral end side of the stopper base portion, and an inner peripheral end portion taper surface is formed on an edge at an opening side in the stopper taper portion, and in arranging of the ring member, the stopper taper portion is abutted to a slope portion of the ball sheet.

3. The manufacturing method for stabilizer links according to claim 1, wherein an inclined angle for a radial direction of the outer peripheral end portion taper surface is set to be not greater than 60 degrees.

4. The manufacturing method for stabilizer links according to claim 1, wherein a length in a radial direction of a contact area with the opening end surface of the ball sheet in the stopper base portion of the ring member is set to be not less than a thickness of the stopper base portion.

5. The manufacturing method for stabilizer links according to claim 1, wherein the ring member is formed by a C-shaped member or half-split members having a space portion between opening end surfaces, and a circumferential direction length of the space portion is set to be not greater than 25% of total circumferential direction length.

6. The manufacturing method for stabilizer links according to claim 2, wherein in the case in which an inner diameter of the stopper taper portion at an endpoint of a contact surface with the slope portion for a stopper taper of the ball sheet is set to be d1, and a ball diameter of the ball stud of the ball portion is set to be d2, the inner diameter d1 of the ring member and the ball diameter d2 of the ball stud satisfy the following Equation 1:

$$d2 \times 0.88 \leq d1 \leq d2 \times 0.9.$$

7. The manufacturing method for stabilizer links according to claim 2, wherein the inclined angle for an axial direction of the stopper taper portion of the ring member is set to be in a range of not less than 30 degrees and not more than 60 degrees.

8. A stabilizer link produced by the manufacturing method for stabilizer links according to claim 1, wherein the stabilizer link comprises a ball stud, a ball seat, a housing, and a ring member.

9. The stabilizer link according to claim 8, wherein in the case in which a length in a radial direction of the outer peripheral end portion taper surface of the stopper base portion of the ring member is set to be L2, a space between an end surface of the caulking portion of the caulked housing and an opening side of the outer peripheral end portion of the stopper base portion is set to be L3, a space between an end surface of the caulking portion of the housing and an outermost portion of the ball portion of the ball stud is set to be L4, an inclined angle for a radial direction of the outer peripheral end portion taper surface be set to be θ2, a ball diameter of the ball stud is set to be d2, a stud releasing load on the ball stud is set to be P, and a lower strength of material tensile strengths of the housing and the ring member is set to be σB, the length in a radial direction L2 of the stopper base portion satisfies the following Equation 2:

$$\frac{\left(\frac{P}{\pi \times d2}\right) \times \left(\frac{L4}{L3}\right)}{\frac{\sigma B}{\cos \theta 2}} \leq L2.$$

* * * * *